(12) United States Patent
Fuerter et al.

(10) Patent No.: US 10,492,082 B2
(45) Date of Patent: Nov. 26, 2019

(54) WIRELESS COMMUNICATION NETWORK INCLUDING LINEAR FRONT-TO-BACK SMALL CELL CONFIGURATIONS

(71) Applicant: T-Mobile USA, Inc., Bellevue, WA (US)

(72) Inventors: Matthew Paul Fuerter, San Ramon, CA (US); SM Sohelozzaman, Pittsburg, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/053,618

(22) Filed: Aug. 2, 2018

(65) Prior Publication Data
US 2019/0116503 A1 Apr. 18, 2019

Related U.S. Application Data

(60) Provisional application No. 62/572,999, filed on Oct. 16, 2017.

(51) Int. Cl.
| | |
|---|---|
| *H04W 40/00* | (2009.01) |
| *H04W 16/32* | (2009.01) |
| *H04W 16/18* | (2009.01) |
| *H04B 7/04* | (2017.01) |
| *H04B 7/06* | (2006.01) |

(52) U.S. Cl.
CPC ........... *H04W 16/32* (2013.01); *H04B 7/04* (2013.01); *H04B 7/0617* (2013.01); *H04W 16/18* (2013.01)

(58) Field of Classification Search
None
See application file for complete search history.

(56) References Cited

U.S. PATENT DOCUMENTS

| | | | |
|---|---|---|---|
| 2012/0170514 A1* | 7/2012 | Lo | H04W 52/262 370/328 |
| 2012/0236731 A1* | 9/2012 | Beaudin | H04W 72/082 370/248 |
| 2013/0029674 A1* | 1/2013 | Arad | H04W 16/02 455/447 |
| 2016/0241317 A1* | 8/2016 | Piazzi | H04B 7/0456 |

* cited by examiner

*Primary Examiner* — Erika A Washington
(74) *Attorney, Agent, or Firm* — Lee & Hayes, P.C.

(57) ABSTRACT

A wireless communication network includes a plurality of network nodes arranged in a distributed architecture. The plurality of network nodes includes one or more macro cells. Each macro cell includes a base station and a plurality of small cells. Each small cell includes an access point node that includes a directional antenna. Each directional antenna includes at least one transmitting lobe. The plurality of small cells is arranged in a Linear Front-to-Back (LFB) arrangement such that a transmitting lobe of a directional antenna is directed towards a non-dominant lobe of a directional antenna that is Line-of-Sight downstream.

20 Claims, 8 Drawing Sheets

WIRELESS COMMUNICATION NETWORK INCLUDING LINEAR FRONT-TO-BACK SMALL CELL CONFIGURATIONS

CROSS REFERENCE TO RELATED APPLICATIONS

This disclosure claims priority to U.S. Provisional Patent Application No. 62/572,999, filed Oct. 16, 2017, which is incorporated herein by reference.

BACKGROUND

In recent years, telecommunication devices have advanced from offering simple voice calling services within wireless communication networks to providing users with many new features. Telecommunication devices now provide messaging services such as email, text messaging, and instant messaging; data services such as Internet browsing; media services such as storing and playing a library of favorite songs; location services; and many others. Thus, telecommunication devices, referred to herein as user devices or mobile devices, are often used in multiple contexts. In addition to the new features provided by the telecommunication devices, users of such telecommunication devices have greatly increased. Such an increase in users is only expected to continue and in fact, it is expected that there could be a growth rate of twenty times more users in the next few years alone.

In general, a performance of wireless communication networks can be improved by reducing a distance between users and base stations that handle the traffic within the wireless communication networks. In some instances, the base stations control telecommunication device traffic within a macro cell. Those macro cells usually include a single base station. The closer a user is to the base station, the more efficient the service provided to the user. For example, a user close to the edge of the macro cell may achieve only five megabits (Mb) per second of performance with a telecommunication device, while a user closer to the base station may achieve a 50 Mb per second performance with a telecommunication device.

To help address such performance issues within wireless networks, heterogeneous networks have been created. In such heterogeneous networks, the macro cells are divided into smaller cells generally referred to as femtocells, pico cells, micro cells, or the like. Each macro cell often remains controlled by a high-power node or base station, while the small cells are often controlled by lower power nodes or access points. The access points control traffic of telecommunication devices within their corresponding small cells.

Generally, the access points are omni-directional antennas and, thus, broadcast wireless signals in all directions. However, the broadcast wireless signals can interfere with each other from multiple omni-directional antennas. Such wireless signal interference is generally also true for small cells utilizing uni-directional or bi-directional antennas when the antennas at least partially face each other.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and an architecture for designing and arranging small cells of a wireless communication network. In particular, the small cells include directional antennas that are arranged using a "Linear Front-to-Back" (LFB) configuration such that the directional antennas have their transmission lobes point at a non-dominant lobe of another directional antenna, e.g., a lobe that does not transmit.

In a configuration, an arrangement of buildings includes small cells of the wireless communication network, where the small cells include directional antennas arranged in a "Linear Front-to-Back" (LFB) arrangement. In configurations, the small cells may include uni-directional antennas, bi-directional antennas, or both. In a configuration, the directional antennas may transmit simulcast wireless signals, although in other configurations the directional antennas may transmit uni-cast wireless signals. As is known, a simulcast refers to multiple antennas transmitting the same wireless signals simultaneously, while a uni-cast refers to transmitting wireless signals via a single antenna. The directional antennas also receive wireless signals.

A transmitting lobe or portion of the directional antennas is directed at a non-dominant lobe or portion of directional antennas (also known as a 'back-lobe" or a "side-lobe"). The LFB small cell configuration is generally defined as a configuration where nodes of small cells use directional antennas and transmitting lobes of directional antennas point at or are directed towards the non-dominant lobes of all other directional antennas that are in a Line-of-Sight "downstream" of the transmitting lobes of the directional antennas. It has been determined that such a configuration provides maximum Signal-to-Interference-plus-Noise ratio (SINR) for ubiquitous coverage within the small cells of the wireless communication network 100.

The LFB small cell configuration as described herein is also useful in configurations where at least a portion of a network is arranged as a small-cell/macro-cell hybrid network, e.g., networks that contain both small-cell transmitters and macro-cell transmitters. In a hybrid network configuration, the LFB arrangement is maintained, or nearly maintained, throughout the entire design, e.g., small cell transmitting lobes of antennas are not pointed at or directed towards macro-cell transmitting lobes of antennas and vise-versa.

In a configuration, the directional antennas are spaced in a range of 100 to 300 meters apart from adjacent directional antennas that are closest to them. In other configurations, the directional antennas may be spaced less than 100 meters or more than 300 meters apart from adjacent bi-directional antennas. Handoff of a mobile device from one directional antenna to another directional antenna may occur when the mobile device is in close proximity, e.g., approximately 10-25 meters, to a non-dominant lobe of another directional antenna. As is known, handoff refers to transitioning routing of wireless signals between the mobile device and a first directional antenna to routing of wireless signals between the mobile device and a second directional antenna.

Figure 1:
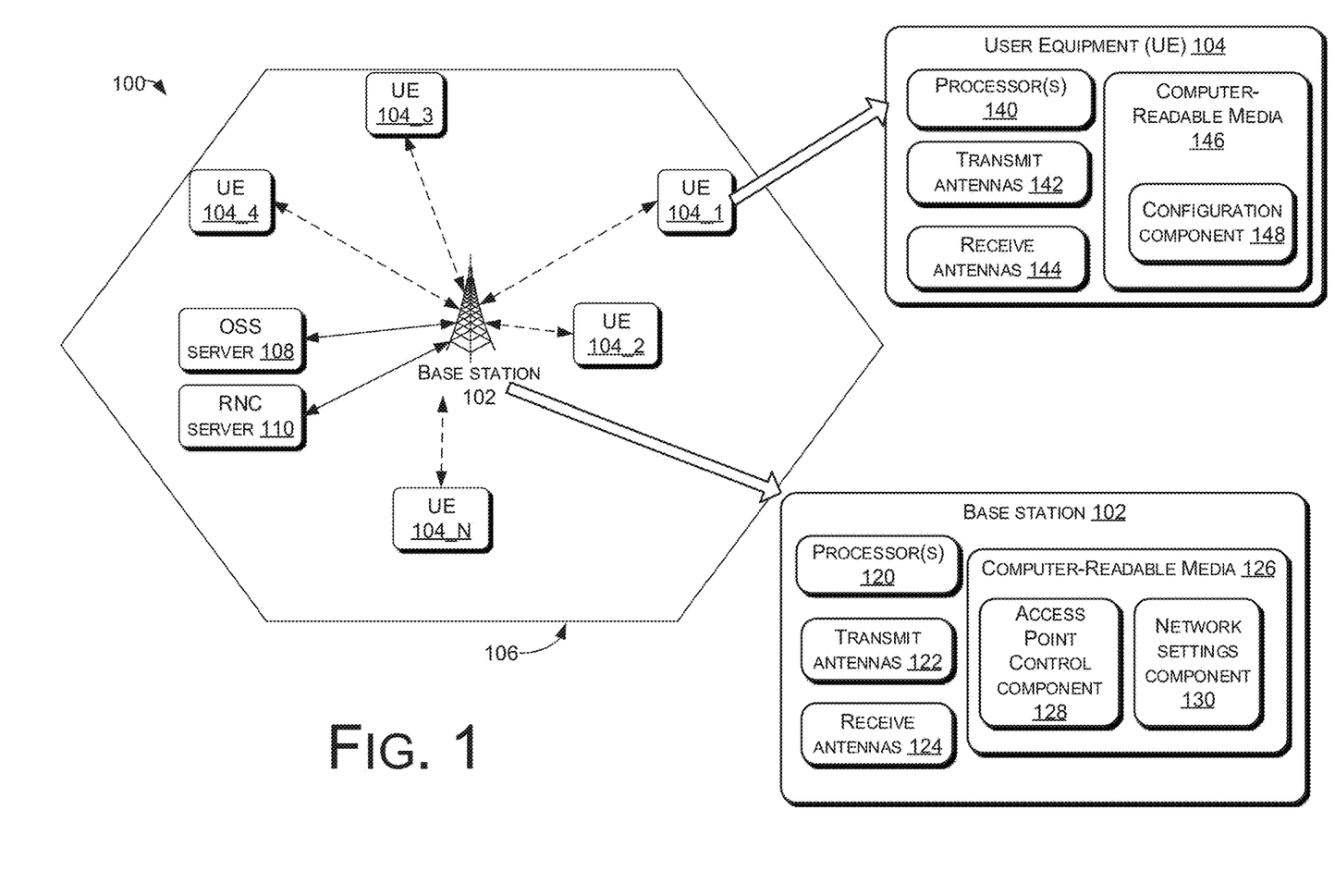
FIG. 1 schematically illustrates a wireless communication network, in accordance with a configuration.

FIG. 1 illustrates a wireless communication network 100 (also referred to herein as network 100). The network 100 comprises a Base Station (BS) 102 communicatively coupled to a plurality of user devices or user equipment, referred to as UEs 104_1, 104_2, . . . , 104_N, where N is an appropriate integer. The BS 102 serves UEs 104 located within a geographical area, e.g., within a macro cell 106. FIG. 1 illustrates the macro cell 106 represented as hexagonal in shape, although other shapes of the macro cell 106 may also be possible. In general, the network 100 comprises a plurality of macro cells 106, with each macro cell 106 including one or more BSs 102.

In an embodiment, the UEs 104_1, . . . , 104_N may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, as well as desktop computers, devices configured as Internet of Things (IoT) devices, integrated devices combining one or more of the preceding devices, and/or the like. As such, the UEs 104 may range widely in terms of capabilities and features. For example, one of the UEs 104 may have a numeric keypad, a capability to display only a few lines of text, and be configured to interoperate with only GSM networks. However, another of the UEs 104 (e.g., a smart phone) may have a touch-sensitive screen, a stylus, an embedded GPS receiver, a relatively high-resolution display, and be configured to interoperate with multiple types of networks. The mobile devices may also include SIM-less devices (i.e., mobile devices that do not contain a functional Subscriber Identity Module ("SIM")), roaming mobile devices (i.e., mobile devices operating outside of their home access networks), and/or mobile software applications.

In an embodiment, the BS 102 may communicate voice traffic and/or data traffic with one or more of the UEs 104_1, . . . , 104_N. The BS 102 may communicate with the UEs 104_1, . . . , 104_N using one or more appropriate wireless communication protocols or standards. In configurations, the BS 102 may serve as an access point for UEs 104 to access the wireless communication network 100. For example, the BS 102 may be configured as one of many types of networks and thus may communicate with UEs 104 using one or more standards, including but not limited to GSM, Time Division Multiple Access (TDMA), Universal Mobile Telecommunications System (UMTS), Evolution-Data Optimized (EVDO), Long Term Evolution (LTE), Fifth Generation (5G), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like. In a configuration, the wireless communication network 100 may include an IMS network and, thus, may provide various services such as, for example, voice over long term evolution (VoLTE) service, video over long term evolution (ViLTE) service and/or rich communication services (RCS).

The BS 102 may be communicatively coupled (e.g., using a backhaul connection, illustrated using solid lines in FIG. 1) to a number of backhaul equipments, e.g., an Operation Support Subsystem (OSS) server 108, a Radio Network Controller (RNC) 110, and/or the like. The RNC 110 can also be in the form of a mobility management entity when the wireless communication network 100 operates according to the Long Term Evolution (LTE) standard or LTE Advanced standard.

In an embodiment, the base station 102 may comprise processor(s) 120, one or more transmit antennas (transmitters) 122, one or more receive antennas (receivers) 124, and computer-readable media 126. The processor(s) 120 may be configured to execute instructions, which may be stored in the computer-readable media 126 or in other computer-readable media accessible to the processor(s) 120. In some embodiments, the processor(s) 120 are a Central Processing Unit (CPU), a Graphics Processing Unit (GPU), or both CPU and GPU, or any other sort of processing unit. The base station 102 can also be in the form of a Node B (where the wireless communication network 100 is 3G UMTS network) or in the form of an eNode B (where the wireless communication network 100 operates according to the LTE standard or LTE Advanced standard).

The one or more transmit antennas 122 may transmit signals to the UEs 104_1, . . . , 104_N, and the one or more receive antennas 124 may receive signals from the UEs 104_1, . . . , 104_N. The antennas 122 and 124 include any appropriate antennas known in the art. For example, antennas 122 and 124 may include radio transmitters and radio receivers that perform the function of transmitting and receiving radio frequency communications. In an embodiment, the antennas 122 and 124 may be included in a transceiver component of the BS 102.

The computer-readable media 126 may include Computer-Readable Storage Media ("CRSM"). The CRSM may be any available physical media accessible by a computing device to implement the instructions stored thereon. CRSM may include, but is not limited to, Random Access Memory ("RAM"), Read-Only Memory ("ROM"), Electrically Erasable Programmable Read-Only memory ("EEPROM"), flash memory or other memory technology, Compact Disc Read-Only memory ("CD-ROM"), Digital Versatile Discs ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store components, such as instructions, data stores, and so forth that are configured to execute on the processor(s) 120. For instance, the computer-readable media 126 may store an access point control component 128 and a network settings component 130, as will be discussed in more detail throughout this disclosure.

Although FIG. 1 illustrates the computer-readable media 126 in the BS 102 storing the access point control component 128 and the network settings component 130, in various other embodiments, the access point control component 128, the network settings component 130, and one or more other components (not illustrated) may be stored in another component of the network 100 (e.g., other than the BS 102). For example, one or more of these components may be stored in a computer-readable media included in the OSS server 108, the RNC 110, another appropriate server associated with the network 100, and/or the like.

Although not illustrated in FIG. 1, various other components (e.g., an operating system component, Basic Input/Output Systems (BIOS), etc.) may also be stored in the computer-readable media 126. Furthermore, although not illustrated in FIG. 1, the base station 102 may comprise several other components, e.g., a power bus configured to supply power to various components of the base station 102, one or more interfaces to communicate with various backhaul equipment, and/or the like.

In an embodiment, the UEs 104 may comprise processor(s) 140, one or more transmit antennas (transmitters) 142, one or more receive antennas (receivers) 144, and computer-readable media 146. The processor(s) 140 may be configured to execute instructions, which may be stored in the computer-readable media 146 or in other computer-readable media accessible to the processor(s) 140. In some embodiments, the processor(s) 140 are a Central Processing Unit (CPU), a Graphics Processing Unit (GPU), or both CPU and GPU, or any other sort of processing unit. The one or more transmit antennas 142 may transmit signals to the base station 102, and the one or more receive antennas 144 may receive signals from the base station 12. In an embodiment, the antennas 142 and 144 may be included in a transceiver component of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 104.

The computer-readable media 146 may store several components, such as instructions, data stores, and so forth that are configured to execute on the processor(s) 140. For instance, the computer-readable media 146 may store a configuration component 148. Although not illustrated in FIG. 1, the computer-readable media 146 may also store one or more applications configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 102, other UEs 104, etc.).

Although not illustrated in FIG. 1, the UEs 104 may also comprise various other components, e.g., a battery, a charging unit, one or more network interfaces, an audio interface, a display, a keypad or keyboard, a GPS receiver and/or other location determination component, and other input and/or output interfaces.

Although FIG. 1 illustrates only one UE (UE 104_1) in detail, each of the UEs 104_2, . . . , 104_N may have a structure that is at least in part similar to that of the UE 104_1. For example, similar to the UE 104_1, each of the UEs 104_2, . . . , 104_N may comprise processor(s), one or more transmit antennas, one or more receive antennas, and computer-readable media including a configuration component.

In an embodiment, the network settings component 130 stored in the computer-readable media 126 maintains a plurality of network settings associated with the network 100. Individual network settings maintained by the network settings component 130 may be pertinent to a single UE of the UEs 104_1, . . . , 104_N, a subset of the UEs 104_1, . . . , 104_N, or each of the UEs 104_1, . . . , 104_N. For example, a network setting of the plurality of network settings may specify a maximum bit rate at which a UE (or each of the UEs 104_1, . . . , 104_N) may transmit data to the BS 102. Another network setting of the plurality of network settings may specify a Transmission Time Interval (TTI) used by each of the UEs 104_1, . . . , 104_N to transmit data to the BS 102. Yet another network setting of the plurality of network settings may specify a maximum power that each of the UEs 104_1, . . . , 104_N may use to transmit data to the BS 102. The plurality of network settings maintained by the network settings component 130 may also include any other appropriate type of network settings.

In an embodiment, one or more of the plurality of network settings maintained by the network settings component 130 may be communicated to the UEs 104_1, . . . , 104_N (e.g., by the transmit antennas 122 to the receive antennas 144 of the UEs 104_1, . . . , 104_N). Based on receiving the network settings, the UEs 104_1, . . . , 104_N (e.g., the corresponding configuration components 148) may configure themselves and communicate with the BS 102 accordingly.

Figure 2:
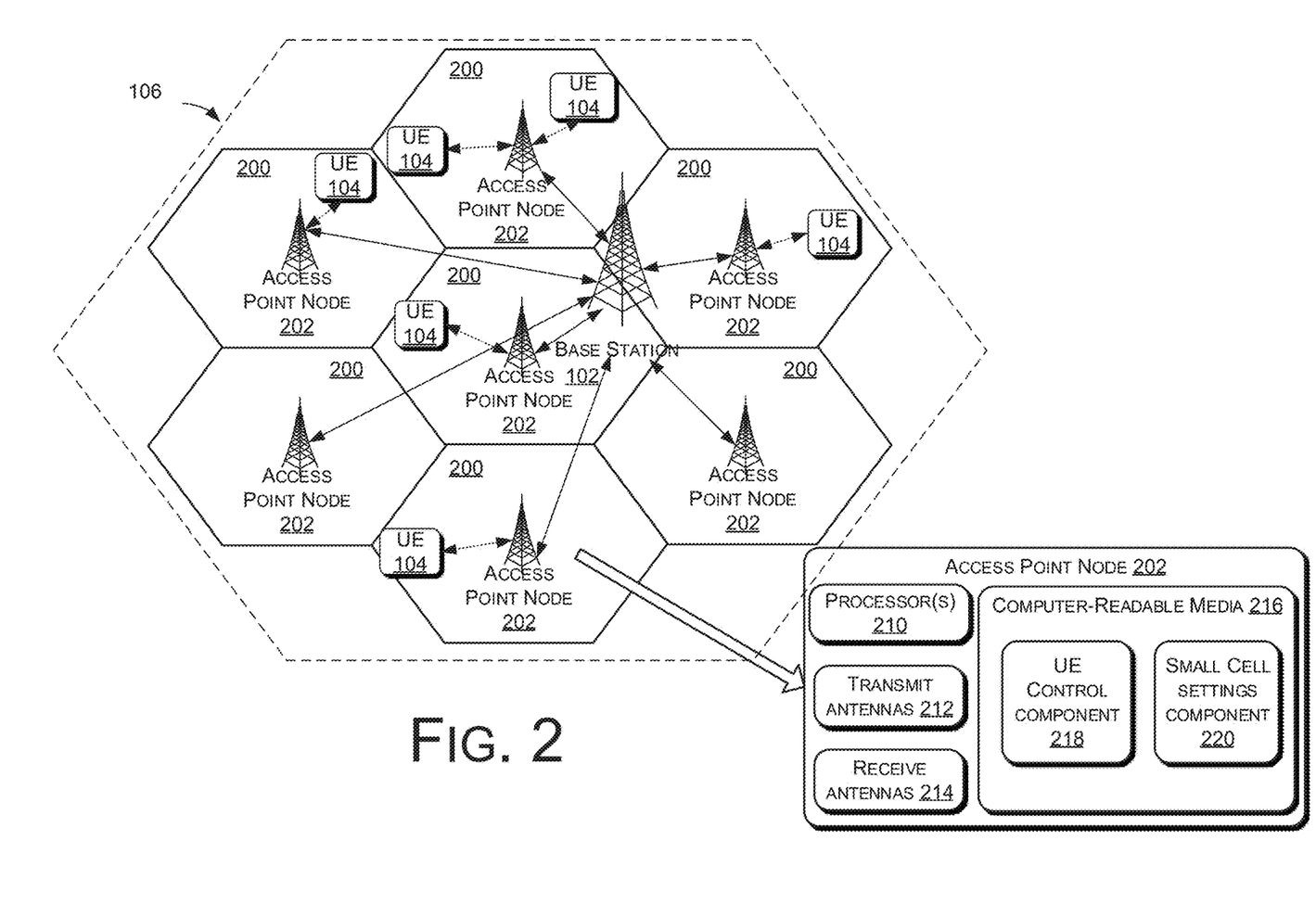
FIG. 2 schematically illustrates a macro cell of the wireless network of FIG. 1 divided into a plurality of small cells, in accordance with a configuration.

FIG. 2 illustrates the macro cell 106 arranged as a heterogeneous network. The macro cell 106 is divided into a plurality of smaller cells referred to as femtocells, pico cells, micro cells (or the like) 200 (referred to herein as small cells 200). Each small cell 200 includes an access point node 202, which is generally a lower power node with respect to the BS 102, which serves as a higher power node for the network 100. Each access point node 202 comprises an antenna and controls and handles transmission of signals within a corresponding small cell 200. While the macro cell 106 is illustrated as including seven small cells 200, more or fewer small cells 200 may be included.

As with the BS 102, in an embodiment, each access point node 202 may communicate voice traffic and/or data traffic with one or more of the UEs 104 that are located within its corresponding small cell 200. The access point node 202 may communicate with the UEs 104 using one or more appropriate wireless communication protocols or standards. For example, the access point node 202 may communicate with the UEs 104 using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like. In a configuration, as previously noted, the wireless communication network 100 may include an IMS network and, thus, may provide various services for the UEs 104 to communicate with the access point node 202 via, for example, voice over long term evolution (VoLTE) service, video over long term evolution (ViLTE) service and/or rich communication services (RCS).

The access point nodes 202 are generally communicatively coupled (e.g., using a backhaul connection, illustrated using solid lines in FIG. 2) to the BS 102. The backhaul connection may include a fiber optic communication channel, a hard wire communication channel, etc.

In an embodiment, the access point nodes 202 may comprise processor(s) 210, one or more transmit antennas 212, one or more receive antennas 214, and computer-readable media 216. The processor(s) 210 may be configured to execute instructions, which may be stored in the computer-readable media 216 or in other computer-readable media accessible to the processor(s) 210. In some embodiments, the processor(s) 210 are a Central Processing Unit (CPU), a Graphics Processing Unit (GPU), or both CPU and GPU, or any other sort of processing unit.

The one or more transmit antennas 212 may transmit signals to the UEs 104, and the one or more receive antennas 214 may receive signals from the UEs 104. The antennas 212 and 214 include any appropriate antennas known in the art. For example, antennas 212 and 214 may include radio transmitters and radio receivers that perform the function of transmitting and receiving radio frequency communications. In an embodiment, the antennas 212 and 214 may be included in a transceiver component of the access point nodes 202.

The computer-readable media 216 for each access point node 202 may include Computer-Readable Storage Media ("CRSM"). The CRSM may be similar to the CRSM discussed above with respect to computer-readable media 126 and 146, for example. The computer-readable media 216 may reside within the access point node 202, on one or more storage devices accessible on a local network to the access point node 202, on cloud storage accessible via a wide area network to the access point node 202, or in any other accessible location.

The computer-readable media 216 may store components, such as instructions, data stores, and so forth that are configured to execute on the processor(s) 210. For instance, the computer-readable media 216 may store a UE control component 218 and a small cell settings component 220, as will be discussed in more detail herein later.

Although not illustrated in FIG. 2, various other components (e.g., an operating system component, Basic Input/Output Systems (BIOS), etc.) may also be stored in the computer-readable media 216. Furthermore, although not illustrated in FIG. 2, each access point node 202 may comprise several other components, e.g., a power bus configured to supply power to various components of the access point node 202, one or more interfaces to communicate with various backhaul equipment, and/or the like.

In an embodiment, the small cell settings component 220 stored in the computer-readable media 216 maintains a plurality of small cell settings associated with a corresponding small cell 200. Individual small cell settings maintained by the small cell settings component 220 may be pertinent to a single UE of the UEs 104, a subset of the UEs 104, or each of the UEs 104. For example, a small cell setting of the plurality of small cell settings may specify a maximum bit rate at which a UE (or each of the UEs 104) may transmit data to the corresponding access point node 202. Another small cell setting of the plurality of small cell settings may specify a Transmit Time Interval (TTI) used by each of the UEs 104 to transmit data to the corresponding access point node 202. Yet another small cell setting of the plurality of small cell settings may specify a maximum power that each of the UEs 104 may use to transmit data to the corresponding access point node 202. Another small cell setting may include a frequency or spectrum to use for transmission and reception of signals within the corresponding small cell 200, as well as a channel within the spectrum. The plurality of network settings maintained by the small cell settings component 220 may also include any other appropriate type of small cell settings.

In an embodiment, one or more of the plurality of small cell settings maintained by the small cell settings component 220 may be communicated to the UEs 104 (e.g., by the transmit antenna 212 to the configuration components 148 of the UEs 104). Based on receiving the small cell settings, the UEs 104 (e.g., the corresponding configuration components 148) may configure themselves and communicate with the corresponding access point node 200 accordingly.

In an embodiment, the access point control component 128 of FIG. 1 of the BS 102 controls the access point nodes 202. For example, the access point control component 128 may provide procedures for communicating with the BS 102, procedures for handing off UEs 104 to the BS 102, procedures for handing off UEs among the various small cells 200 and access point nodes 202, etc. Likewise, the UE control component 218 of the access point nodes 202s controls the UEs 104 within the respective small cells. For example, the UE control component 218 may provide procedures for communicating with the corresponding access point node 202, procedures for handing off UEs 104 to the BS 102, procedures for handing off UEs among the various small cells 200 and access point nodes 202, etc.

Thus, the wireless communication network 100 of FIGS. 1 and 2 is arranged as a distributed architecture made up of network nodes including multiple macro cells 106 and small cells 200. The wireless communication network 100 provides services to a UE 104 that registers with the wireless communication network 100. Services provided within the wireless communication network 100 may include, for example, voice calling services (e.g. telephone calls), Internet access, messaging (e.g., Short Message Service (SMS) messages, Multi-Media Message Service (MMS) messages, Instant Messaging (IM) messages, Enhanced Message Service (EMS) messages, etc.), video services, etc. Such services are generally provided via various nodes of the wireless communication network 100 implemented via servers that UEs 104 access, i.e. the UEs 104 register with the wireless communication network 100 via a node. The nodes also provide various other services within the wireless communication network 100.

Figure 3A:
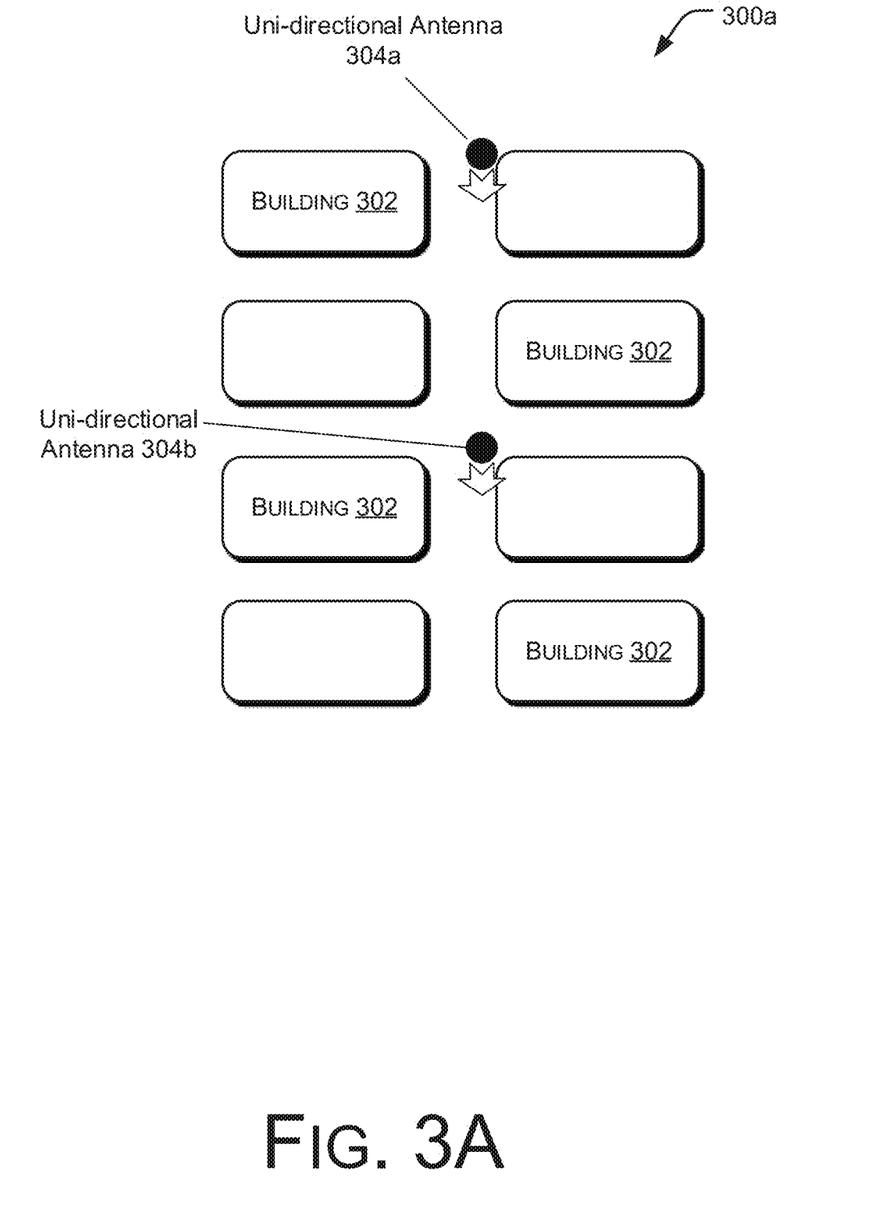
FIGS. 3A and 3B schematically illustrate small cells of the wireless network of FIG. 1 including directional antennas arranged using a "Linear Front-to-Back" (LFB) arrangement, in accordance with a configuration.

FIG. 3A schematically illustrates an example of an arrangement 300a of buildings 302 within a "Linear Front-to-Back" (LFB) small cell arrangement, in accordance with a configuration. The example arrangement 300a of FIG. 3A includes two uni-directional antennas 304a and 304b representing access point nodes 202 of a macro cell 106 of the wireless communication network 100. In a configuration, the uni-directional antennas 304 transmit simulcast wireless signals, although in other configurations, the uni-directional antennas 304 may transmit uni-cast wireless signals. The uni-directional antennas 304 also receive wireless signals. It is to be understood that the example arrangement 300a generally includes more than two uni-directional antennas 304.

As can be seen, a front lobe (e.g., a transmitting lobe or portion) of uni-directional antenna 304a is directed at a back-lobe (e.g., a non-dominant lobe or portion) of uni-directional antenna 304b. The LFB small cell configuration is generally defined as a configuration where nodes of small cells use directional antennas and front lobes of directional antennas 304 point at the back-lobes of all other directional antennas that are Line-of-Sight "downstream" of the front lobes of the directional antennas 304. It has been determined that such a configuration provides maximum Signal-to-Interference-plus-Noise ratio (SINR) for ubiquitous coverage within the small cells 200 of the wireless communication network 100.

Figure 3B:
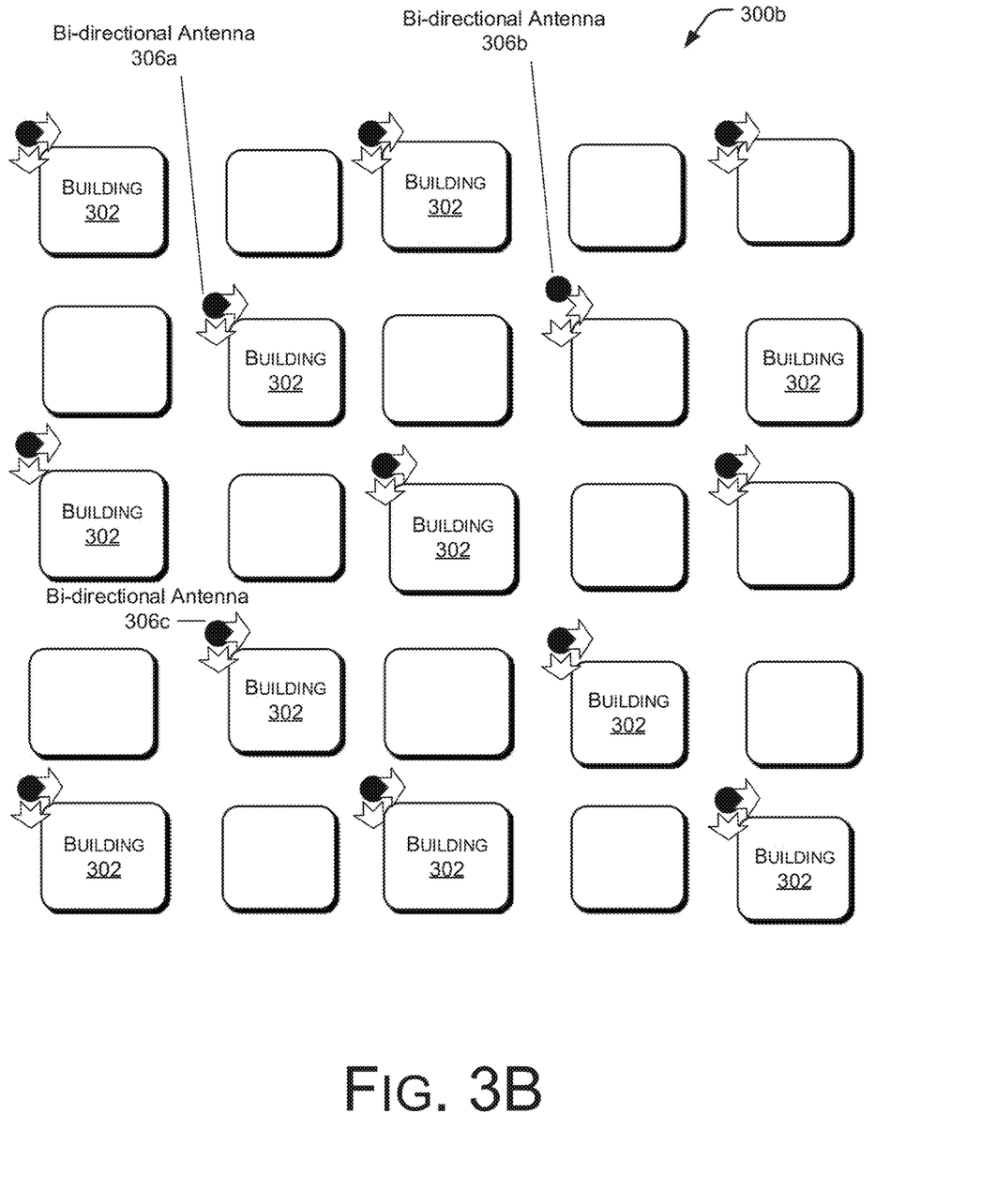

FIG. 3B schematically illustrates an example arrangement 300b of buildings 302 within a LFB small cell arrangement utilizing bi-directional antennas 306, in accordance with a configuration. In a configuration, the bi-directional antennas 306 transmit simulcast wireless signals, although in other configurations the bi-directional antennas 306 may transmit uni-cast wireless signals. The bi-directional antennas 306 also receive wireless signals. The example arrangement 300b of FIG. 3B includes thirteen bi-directional antennas 306 representing access point nodes 202 of a macro cell 106 of the wireless communication network 100. It is to be understood that the example arrangement 300b may include more or fewer than thirteen bi-directional antennas 306. Additionally, while the example arrangement 300b illustrates only bi-directional antennas 306, the example arrangement 300b may include both uni-directional antennas 304 and bi-directional antennas 306.

As can be seen, transmitting lobes of the bi-directional antenna 306a are directed at a non-dominant lobe of bi-directional antenna 306b and at a non-dominant lobe of bi-directional antenna 306c. Thus, transmitting lobes of the bi-directional antennas 306 point at non-dominant lobes of other bi-directional antennas 306 that are Line-of-Sight "downstream" of the transmitting lobes of the bi-directional antennas 306.

In a configuration, the bi-directional antennas 306 are spaced in a range of 100 to 300 meters apart from adjacent bi-directional antennas 306 that are closest to them. In other configurations, the bi-directional antennas 306 may be spaced less than 100 meters or more than 300 meters apart from adjacent bi-directional antennas 306. Handoff of a UE 104 from one bi-directional antenna 306 to another bi-directional antenna 306 generally occurs when the UE 104 is in close proximity, e.g., approximately 10-25 meters, to a back-lobe of another bi-directional antenna 306. The actual hand-off distance may vary based on the coverage radius of the "upstream" access point 202, e.g., the upstream bi-directional antenna 306.

Generally, the example arrangements of FIG. 3a and especially FIG. 3B provides improved SINR. This may be attributed to a low path loss slope being less than the free space path loss slop, as well as the generally short propagation distances (e.g., usually 200 meters or less) of small cell design configurations, which may lead to high Reference Signal Received Power ("RSRP") (e.g., relative to conventional configurations). The low path loss slope generally refers to a propagation loss slope among the buildings 302 (often referred to as the "Urban Canyon" propagation loss slope), which is almost always less than free space path loss slope (e.g., the propagation loss slope in free space). That is the low path loss slope is less than 20 dB per decade. The high RSRP generally creates very high Signal to Noise Ratios (SNR). In fact, SNR is generally greater than 50 dB for small cell coverage in the small cells 200 of the wireless communication network 100.

The SINR between two directional antennas 304, 306, (e.g., bi-directional antenna 306a and bi-directional antenna 306b, bi-directional antenna 306a and bi-directional antenna 306c, and uni-directional antenna 304a and uni-directional antenna 304b), is driven mainly by interference from other bi-directional antennas 304, 306 and macro-layer interference, e.g., interference caused by the base station 102. As a first consideration, with respect to the interference that two directional antennas cause each other, at any given point between the two directional antennas the SINR is mainly dependent on two factors. A first factor relates to the Effective Isotropic Radiated Power (EIRP) difference at any given point between the two directional antennas. Assuming equal power input to each of the directional antennas, the EIRP difference will generally only depend on the gain in the direction of the given point being considered. A second factor relates to the propagation loss difference between the two directional antennas. Thus, the total SINR, at a given point between two directional antennas, is essentially (neglecting thermal noise and macro-layer interference for the time being) the sum of the EIRP difference and the propagation loss difference.

Figure 4A:
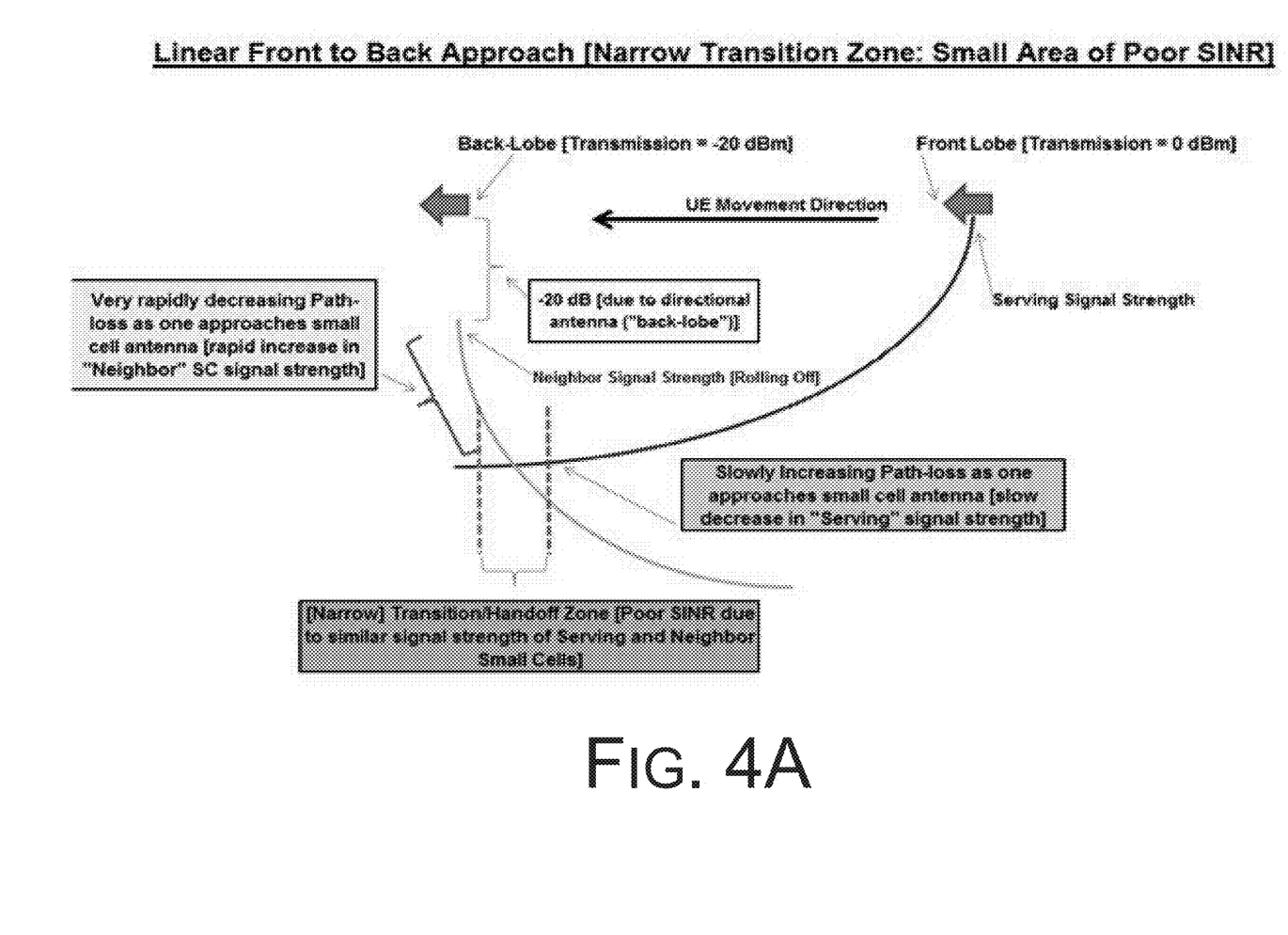
FIG. 4A is a diagram illustrating a narrow mobile device transition or hand-off zone providing a small area of poor Signal-to-Interference-plus-Noise ratio (SINR) using the LFB arrangement, in accordance with a configuration.
Figure 4B:
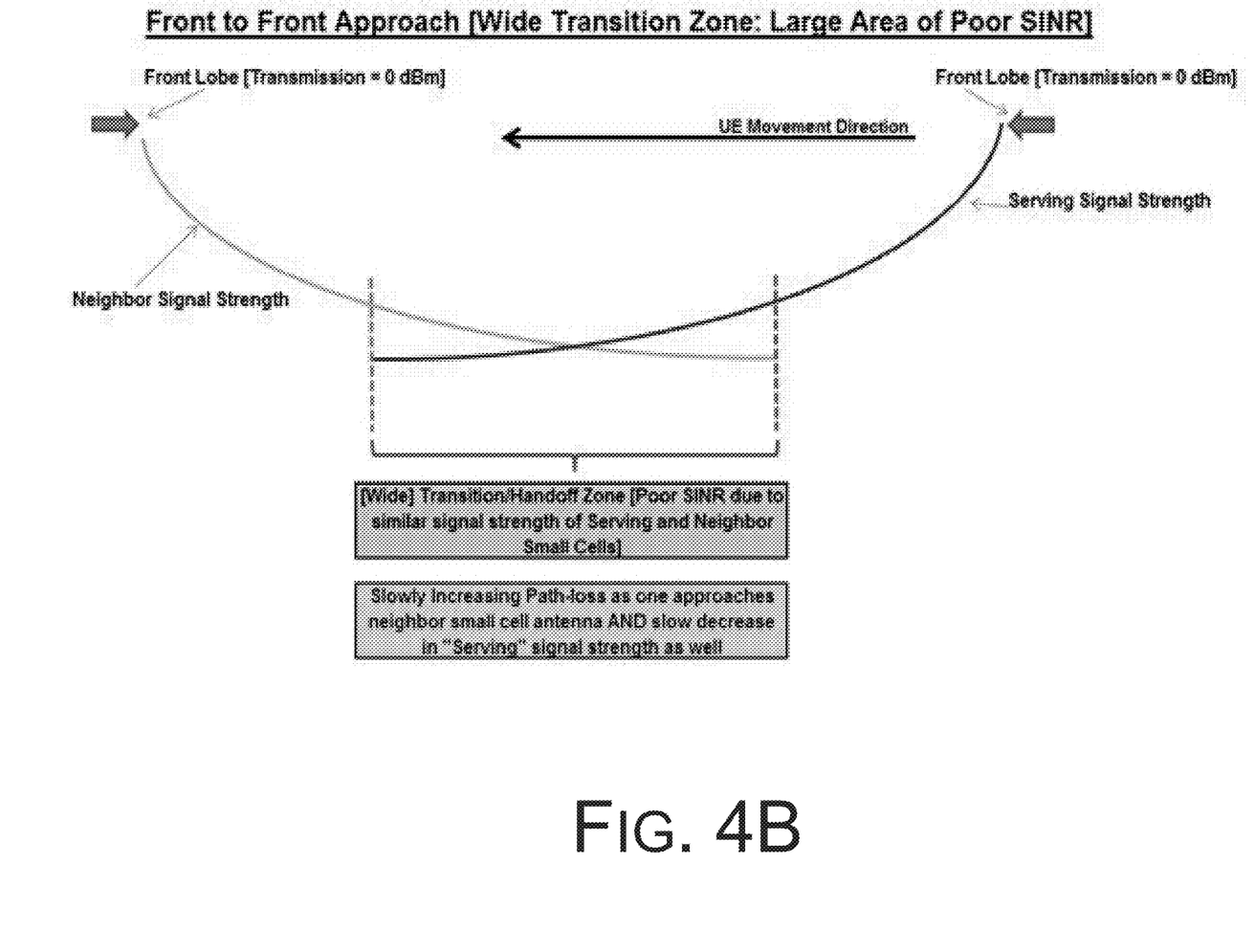
FIG. 4B is a diagram illustrating a wide mobile device transition or hand-off zone providing a large area of poor SINR without using the LFB arrangement.

When the front lobes (e.g., the transmitting lobes or portions) of two directional antennas face each other, the areas of reduced SINR between the two directional antennas tend to be in a middle area between the two directional antennas. However, when the LFB configuration between directional antennas is used, areas of poor SINR tend to be near the back of the opposite facing directional antennas, e.g., the non-transmitting back-lobes of the opposite facing directional antennas. As is known, the propagation path loss gradient is very large near a transmitting front lobe of an antenna and the path loss gradient decreases sharply as the distance increases between the transmitting front lobe of the antenna and a measurement point. This results in the area of transition (overlap) between two spatially separated antennas, e.g., access point nodes 202, may be minimized by forcing the transition (and thus, overlap) to occur as close as possible to one access point node 202 or the other. Such is the case when the LFB technique described herein is used to configure the network. In the LFB configuration/technique described herein, the transition is forced to occur near the "downstream/neighbor" access point node 202 due to the LFB directional configuration shown in FIG. 4A. The transition occurring near one of the access point nodes 202 is in contrast to the case where the transition/overlap occurs at an equal distance between two or more access point nodes 202, in which case the transition/overlap is actually maximized, which is the when the transmitting front-lobes of antennas face each other as may be seen in FIG. 4B.

Thus, in an LFB configuration of directional antennas of small cells 200, it is possible to minimize areas of high interference between directional antennas by placing the transition zone close to one directional antenna or the other directional antenna. Accordingly, the areas of transition (e.g., low SINR) are minimized due to the rapid change in path loss in those areas. This results in better overall Quality of Service (QoS) for UEs 104 by minimizing the area of poor SINR between neighboring small cells 200 and between neighboring macro-cells and small cells in hybrid network configurations. It is to be noted that in LTE networks the UE measured Reference Signal Received Power (RSRP) may be used to determine desirable ways for UE transition between cells 200, e.g., handoffs. It is also possible to use Reference Signal Received Quality (RSRQ) for LTE transition processing (LTE handoffs). As is known, RSRQ is similar to SINR.

Figure 5:
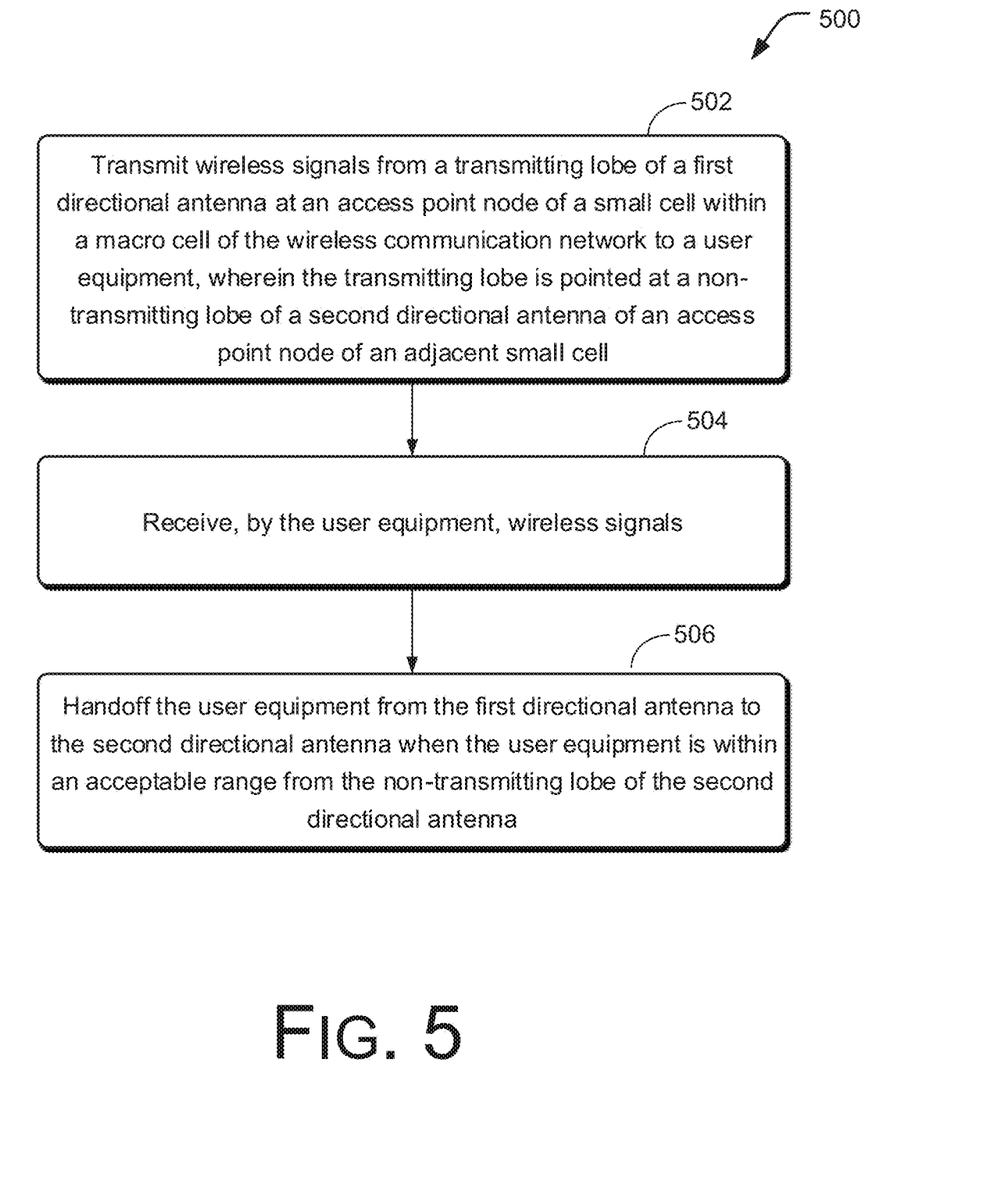
FIG. 5 is a flowchart illustrating an example method for transmitting wireless signals in the distributed architecture of the wireless communication networks of FIGS. 1-3, in accordance with a configuration.

FIG. 5 is a flow diagram of an illustrative process that may be implemented within the wireless communication network 100. This process (as well as other processes described throughout) are illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processors and processing cores in other environments and computing devices.

FIG. 5 illustrates a method 500 for transmitting wireless signals in a wireless communication network, e.g., wireless communication network 100 of FIG. 1, arranged in a distributed architecture and comprising one or more macro cells, e.g., macro cell 106, including a plurality of small cells, e.g., small cells 200. As illustrated, at block 502, wireless signals are transmitted from a first directional antenna, e.g., uni-directional antennas 304 and bi-directional antennas 306, at an access point node, e.g., access point node 202, of a small cell within a macro cell of the wireless communication network to a user equipment, e.g., UE 104, within the small cell. The wireless signals are transmitted from a transmitting lobe of the first directional antenna towards a non-dominant lobe of a second directional antenna of an access point node of an adjacent small cell of the macro cell that is Line-of-Sight downstream from the first directional antenna of the small cell. At block 504, the user equipment receives wireless signals. At block 506, the user equipment is handed-off from the first directional antenna to the second directional antenna when the user equipment is within an acceptable range (e.g. 10 to 25 meters) from the non-dominant lobe of the second directional antenna. This can be determined in a number of ways. For example, the SINR between the small cell 200 that includes the first directional antenna may be compared with the SINR of the small cell 200 that includes the second directional antenna. If the SINR of the small cell 200 that includes the second directional antenna is stronger than the SINR of the small cell that includes the first directional antenna, then the user equipment may be handed off to the second directional antenna.

Figure 6:
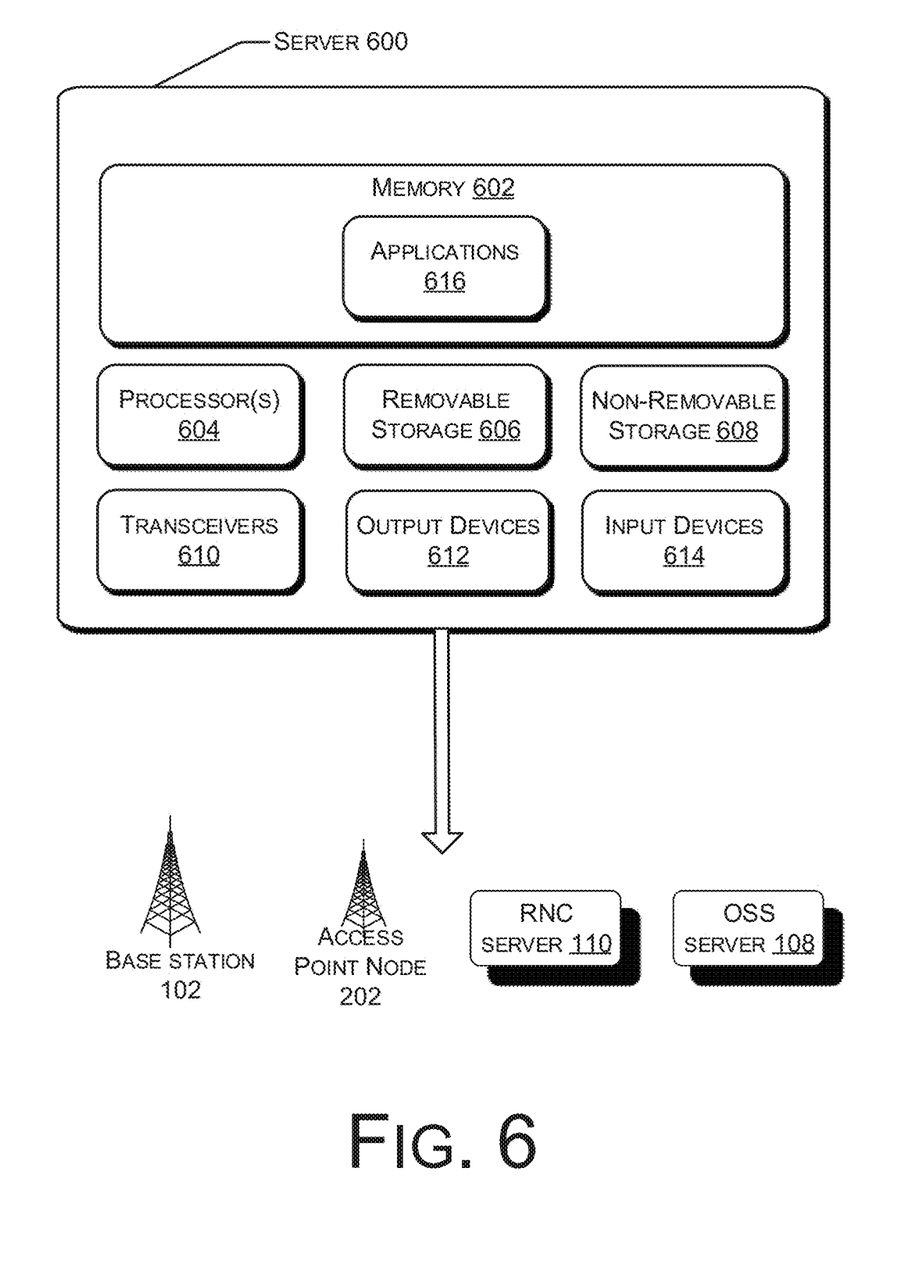
FIG. 6 illustrates a component level view of a server configured for use in the arrangements of FIGS. 1-3 to provide various services of the wireless communication network of FIGS. 1-3.

FIG. 6 schematically illustrates a component-level view of a server 600 configured for use within a network, e.g., wireless communication network 100, in order to implement various nodes and provide various services within the wireless communication network, according to the techniques described herein. For example, the server 600 may be configured to implement base station 102, the OSS server 108, the RNC 110, access point nodes 202 associated with uni-directional antennas 304 or bi-directional antennas 306, etc.

As illustrated, the server 600 comprises a system memory 602. Also, the server 600 includes processor(s) 604, a removable storage 606, a non-removable storage 608, transceivers 610, output device(s) 612, and input device(s) 614.

In various implementations, system memory 602 is volatile (such as RAM), non-volatile (such as ROM, flash memory, etc.) or some combination of the two. In some implementations, the processor(s) 604 is a Central Processing Unit (CPU), a Graphics Processing Unit (GPU), or both CPU and GPU, or any other sort of processing unit. System memory 602 may also include applications 616 that allow the server to perform various functions.

The server 600 may also include additional data storage devices (removable and/or non-removable) such as, for example, magnetic disks, optical disks, or tape. Such additional storage is illustrated in FIG. 6 by removable storage 606 and non-removable storage 608.

Non-transitory computer-readable media may include volatile and nonvolatile, removable and non-removable tangible, physical media implemented in technology for storage of information, such as computer readable instructions, data structures, program components, or other data. System memory 602, removable storage 606 and non-removable storage 608 are all examples of non-transitory computer-readable media. Non-transitory computer-readable media include, but are not limited to, RAM, ROM, EEPROM, flash memory or other memory technology, CD-ROM, Digital Versatile Discs (DVD) or other optical storage, magnetic cassettes, magnetic tape, magnetic disk storage or other magnetic storage devices, or any other tangible, physical medium which can be used to store the desired information and which can be accessed by the server 600. Any such non-transitory computer-readable media may be part of the server 600.

In some implementations, the transceivers 610 include any sort of transceivers known in the art. For example, the transceivers 610 may include wired communication components, such as an Ethernet port, for communicating with other networked devices. Also or instead, the transceivers 610 may include wireless modem(s) to may facilitate wireless connectivity with other computing devices. Further, the transceivers 610 may include a radio transceiver that performs the function of transmitting and receiving radio frequency communications via an antenna.

In some implementations, the output devices 612 include any sort of output devices known in the art, such as a display (e.g., a liquid crystal display), speakers, a vibrating mechanism, or a tactile feedback mechanism. Output devices 612 also include ports for one or more peripheral devices, such as headphones, peripheral speakers, or a peripheral display.

In various implementations, input devices 614 include any sort of input devices known in the art. For example, input devices 614 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A wireless communication network comprising a plurality of network nodes arranged in a distributed architecture, the plurality of network nodes comprising:
one or more macro cells, each macro cell comprising:
a base station; and
a plurality of small cells, wherein at least some of the small cells of the plurality of small cells comprise an access point node including a directional antenna comprising at least one transmitting lobe, wherein the at least some of the small cells are arranged in a Linear Front-to-Back (LFB) arrangement such that transmitting lobes of directional antennas are configured to transmit in a direction of non-dominant lobes of directional antennas that are Line-of-Sight downstream,
wherein a first directional antenna of a first small cell is spaced in a range of 100 to 300 meters from a second directional antenna of a second small cell, the second small cell being adjacent to the first small cell.

2. The wireless communication network of claim 1, wherein each directional antenna comprises a bi-directional antenna.

3. The wireless communication network of claim 1, wherein each directional antenna comprises a uni-directional antenna.

4. The wireless communication network of claim 1, wherein each directional antenna comprises either a bi-directional antenna or a uni-directional antenna.

5. The wireless communication network of claim 1, wherein each access point node is configured to handoff a user equipment to a directional antenna of an access point node of an adjacent small cell when the user equipment is within a range of 10 to 25 meters from a non-dominant lobe of the directional antenna of the access point node of the adjacent small cell.

6. The wireless communication network of claim 1, wherein each small cell is configured to provide a signal-to-noise ratio (SNR) of at least 50 decibels (dB).

7. A small cell configured for use within a macro cell of a wireless communication network, the small cell comprising:
an access point node including a directional antenna comprising at least one transmitting lobe,
wherein the at least one transmitting lobe of the directional antenna is configured to transmit in a direction of a non-dominant lobe of a directional antenna of other small cells within the macro cell that are Line-of-Sight downstream, and
wherein the directional antenna is spaced in a range of 100 to 300 meters from other directional antennas of other small cells within the macro cell.

8. The small cell of claim 7, wherein the directional antenna comprises a bi-directional antenna.

9. The small cell of claim 7, wherein the directional antenna comprises a uni-directional antenna.

10. The small cell of claim 7, wherein the access point node is configured to handoff a user equipment to a directional antenna of an access point node of an adjacent small cell when the user equipment is within a range of 10 to 25 meters from a non-dominant lobe of the directional antenna of the access point node of the adjacent small cell.

11. The small cell of claim 7, wherein the small cell is configured to provide a signal-to-noise ratio (SNR) of at least 50 decibels (dB).

12. A method of transmitting wireless signals within a wireless communication network, the method comprising:
transmitting, from a first directional antenna at an access point node of a small cell within a macro cell of the wireless communication network, the wireless signals to a user equipment within the small cell, wherein the wireless signals are transmitted from a transmitting lobe of the first directional antenna towards a non-dominant lobe of a second directional antenna of an access point node of an adjacent small cell of the macro cell that is Line-of-Sight downstream from the first directional antenna of the small cell,
wherein the first directional antenna is spaced in a range of 100 to 300 meters apart from the second directional antenna.

13. The method of claim 12, wherein the wireless signals comprise simulcast wireless signals.

14. The method of claim 12, wherein the first and second directional antennas comprise bi-directional antennas.

15. The method of claim 12, wherein the first and second directional antennas comprise uni-directional antennas.

16. The method of claim 12, wherein the first directional antenna comprises either a bi-directional antenna or a uni-directional antenna and the second directional antenna comprises either a bi-directional antenna or a uni-directional antenna.

17. The method of claim 12, further comprising:
determining that the user equipment is within a range of 10 to 25 meters of the non-dominant lobe of the second directional antenna; and
based at least in part on the determining, handing off the user equipment from the first directional antenna to the second directional antenna.

18. A wireless communication network comprising a plurality of network nodes arranged in a distributed architecture, the plurality of network nodes comprising:
one or more macro cells, each macro cell comprising:
a base station; and
a plurality of small cells, wherein at least some of the small cells of the plurality of small cells comprise an access point node including a directional antenna comprising at least one transmitting lobe, wherein the at least some of the small cells are arranged in a Linear Front-to-Back (LFB) arrangement such that transmitting lobes of directional antennas are configured to transmit in a direction of non-dominant lobes of directional antennas that are Line-of-Sight downstream,
wherein each access point node is configured to handoff a user equipment to a directional antenna of an access point node of an adjacent small cell when the user equipment is within a range of 10 to 25 meters from a non-dominant lobe of the directional antenna of the access point node of the adjacent small cell.

19. A small cell configured for use within a macro cell of a wireless communication network, the small cell comprising:
an access point node including a directional antenna comprising at least one transmitting lobe,
wherein the at least one transmitting lobe of the directional antenna is configured to transmit in a direction of a non-dominant lobe of a directional antenna of other small cells within the macro cell that are Line-of-Sight downstream, and wherein the access point node is configured to handoff a user equipment to a directional antenna of an access point node of an adjacent small cell when the user equipment is within a range of 10 to 25 meters from a non-dominant lobe of the directional antenna of the access point node of the adjacent small cell.

20. A method of transmitting wireless signals within a wireless communication network, the method comprising:

transmitting, from a first directional antenna at an access point node of a small cell within a macro cell of the wireless communication network, the wireless signals to a user equipment within the small cell, wherein the wireless signals are transmitted from a transmitting lobe of the first directional antenna towards a non-dominant lobe of a second directional antenna of an access point node of an adjacent small cell of the macro cell that is Line-of-Sight downstream from the first directional antenna of the small cell;

determining that the user equipment is within a range of 10 to 25 meters of the non-dominant lobe of the second directional antenna; and based at least in part on the determining, handing off the user equipment from the first directional antenna to the second directional antenna.

* * * * *